United States Patent
Ohtsuki et al.

(10) Patent No.: US 6,757,585 B2
(45) Date of Patent: Jun. 29, 2004

(54) MANAGEMENT SYSTEM FOR VENDING MACHINES

(75) Inventors: Takahiro Ohtsuki, Isesaki (JP); Masaru Ohkubo, Isesaki (JP)

(73) Assignee: Sanden Corp., Gunma (JP)

( * ) Notice: Subject to any disclaimer, the term of this patent is extended or adjusted under 35 U.S.C. 154(b) by 0 days.

(21) Appl. No.: 09/935,063

(22) Filed: Aug. 23, 2001

(65) Prior Publication Data

US 2002/0026366 A1 Feb. 28, 2002

(30) Foreign Application Priority Data

Aug. 23, 2000 (JP) ........................................ 2000-251914
Aug. 23, 2000 (JP) ........................................ 2000-251919

(51) Int. Cl.⁷ .............................................. G06F 17/00
(52) U.S. Cl. ...................... 700/237; 700/236; 700/241; 700/244; 235/381; 455/406
(58) Field of Search ............................... 700/231, 236, 700/237, 241, 244; 235/381, 385; 455/406

(56) References Cited

U.S. PATENT DOCUMENTS

| | | | | |
|---|---|---|---|---|
| 5,842,976 A | * | 12/1998 | Williamson | 600/300 |
| 5,844,808 A | * | 12/1998 | Konsmo et al. | 700/244 |
| 5,930,771 A | | 7/1999 | Stapp | |
| 5,959,275 A | * | 9/1999 | Hughes et al. | 235/375 |
| 5,963,452 A | * | 10/1999 | Etoh et al. | 700/236 |
| 6,308,111 B1 | * | 10/2001 | Koga | 700/236 |
| 6,330,491 B1 | * | 12/2001 | Lion | 700/237 |
| 6,360,141 B1 | * | 3/2002 | Jensen | 700/237 |
| 6,430,470 B1 | * | 8/2002 | Nakajima et al. | 700/237 |
| 6,462,644 B1 | * | 10/2002 | Howell et al. | 340/5.92 |
| 6,535,726 B1 | * | 3/2003 | Johnson | 455/406 |

FOREIGN PATENT DOCUMENTS

| | | |
|---|---|---|
| JP | 06-119537 | 4/1994 |
| JP | 09-259337 | 10/1997 |
| JP | 10-124585 | 5/1998 |
| JP | 11-306424 | 11/1999 |
| WO | WO 95/05609 | 2/1995 |
| WO | WO 00/19748 | 4/2000 |

* cited by examiner

Primary Examiner—Khoi H. Tran
(74) Attorney, Agent, or Firm—Banner & Witcoff, Ltd.

(57) ABSTRACT

In a management system for vending machines, comprising a plurality of vending machines and a host computer being connected to those vending machines via a network and enabled to manage each of those vending machines in a concentrated manner, the host computer can be accessed from a portable communication terminal via another network.

10 Claims, 6 Drawing Sheets

| TERMINAL ID | MAIL ADDRESS | ID NUMBER | PASSWORD | TEMPORARY PASSWORD | VALIDITY TERM |
|---|---|---|---|---|---|
| AAAA | aaa@xxx.co.jp | LLLL | XXXX | ---- | 30 DAYS |
| BBBB | bbb@xxx.co.jp | MMMM | YYYY | QQQQ | 0 DAY |
| CCCC | ccc@xxx.co.jp | NNNN | ZZZZ | ---- | 15 DAYS |

| VENDING MACHINE ID (611) | COLUMN NUMBER (612) | PRODUCT ID (613) | PRODUCT NAME (614) |
|---|---|---|---|
| A001 | 01 | AA01 | A COFFEE |
| A001 | 02 | AA01 | A COFFEE |
| A001 | 03 | BB02 | B COFFEE |
| B011 | 01 | MT01 | M BEER |

| VENDING MACHINE ID (611) | PRODUCT ID (613) | PRODUCT NAME (614) | SALES ACCOUNT (615) |
|---|---|---|---|
| A001 | AA01 | A COFFEE | 130 |
| A001 | BB02 | B COFFEE | 085 |
| B011 | MT01 | M BEER | 179 |
| B011 | KA09 | K BEER | 023 |

MANAGEMENT SYSTEM FOR VENDING MACHINES

BACKGROUND OF THE INVENTION

1. Field of the Invention

The present invention relates to a system for managing a plurality of vending machines in a concentrated manner via a host computer.

2. Description of the Prior Art

Conventionally, such the concentrated management system for vending machines manages both operation and sales states of each of a plurality of vending machines in a concentrated manner with use of a host computer connected to those vending machines installed at various places via a specific network. This network uses a wired or radio leased line. The host computer is enabled to access a portable communication terminal. The manager who is in charge of maintenance and management of those vending machines, as well as supply of products to those vending machines can refer to various information items managed by the host computer via the portable communication terminal.

For this type management system, various information items managed by the host computer must be prevented from its leakage to third parties. This is why a leased line is used for the conventional closed communication network between the portable communication terminal and the host computer, so that the host computer is prevented from illegal accesses to the host computer from third parties. However, the use of such the leased line requires an enormous cost.

Products loaded in each vending machine are replaced periodically at each change of the season. The manager makes this replacement of products stacked in a product-stacking column. And, after such a replacement, the manager updates the information on products loaded in the product-stacking column in the host computer. Conventionally, however, the following problem often occurs; in case where a product in a product-stacking column is sold after such a product replacement in a vending machine and the sales information is sent to the host computer before the product information is updated in the host computer, then the host computer updates the number of sold products wrongly, that is, differently from the number of actually sold products. In other words, the host computer might fail in management of the number of sold products.

BRIEF SUMMARY OF THE INVENTION

Object of the Invention

Under such circumstances, it is an object of the present invention to provide a management system for vending machines manufactured at a lower cost and improved more in convenience of usage.

Summary of the Invention

In order to achieve the above object, the present invention provides a management system for vending machines, comprising a plurality of vending machines and a host computer connected to each of those vending machines via a first network and enabled to manage those vending machines. The host computer includes management information storage for storing management information on each of the vending machines and remote management controller for accepting a connection from a portable communication terminal via a second network so as to enable the portable communication terminal to access the management information stored in the management information storage.

According to the present invention, the portable communication terminal is connected to the host computer via the second network and enabled to access the management information on each vending machine managed by the host computer. Consequently, the host computer can manage the latest proper information on each vending machine, since the manager, after doing maintenance of each vending machine, updates the management information in the host computer according by the maintenance result with use of the portable communication terminal.

The host computer in a preferred embodiment comprises identification information storage for storing identification information on a portable communication terminal of which connection is to be enabled and certifying means for certifying the portable communication terminal according to the identification information received from the portable communication terminal when communication with the portable communication terminal is started and the identification information stored in the identification information storage.

According to the present invention, therefore, because the certifying means certifies the portable communication terminal, illegal accesses from third parties can be prevented. And, because the certifying means assures the security, it is possible to use a network which opens to the public as a communication path between the portable communication terminal and the remote management controller instead of the network composed of a leased line. Consequently, the system construction cost can be reduced.

The management information storage in another preferred embodiment comprises sales information storage for storing sales information on products for each vending machine and for each product, as well as correspondence information storage for storing information on correspondence between each product-stacking column in which the products are stacked and products sold in the vending machine, for each vending machine. The remote management controller updates the corresponding information stored in the correspondence information storage upon a request from the portable communication terminal.

Consequently, it is possible to update the correspondence information stored in the host computer via the portable communication terminal even when the correspondence between each product-stacking column and the products stacked in the product-stacking column is changed. This is why the host computer can keep and manage the latest and proper sales figure information on each product.

The above and other objects, construction and advantage of the present invention will be seen by reference to the description taken in connection with the accompanying drawings.

BRIEF DESCRIPTION OF THE SEVERAL VIEWS OF THE DRAWINGS

FIG. 6 is a data structure of a product correspondence information table in the second embodiment of the present invention;

FIG. 7 is a data structure of a product sales table in the second embodiment of the present invention;

DETAILED DESCRIPTION OF THE INVENTION (First Embodiment)

Figure 1:
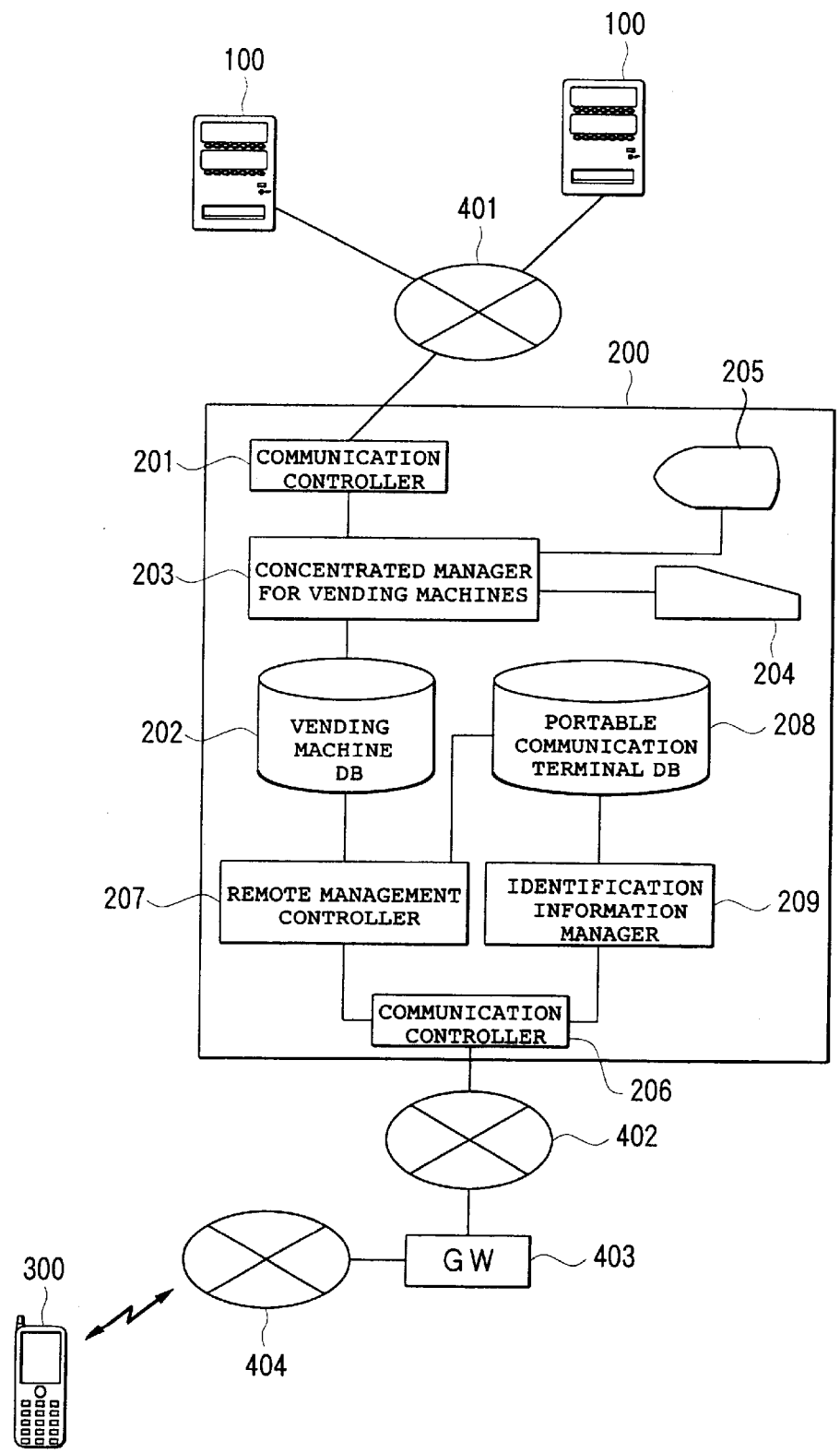
FIG. 1 is a block diagram of a management system for vending machines in the first embodiment of the present invention.
Figures 2, 3:
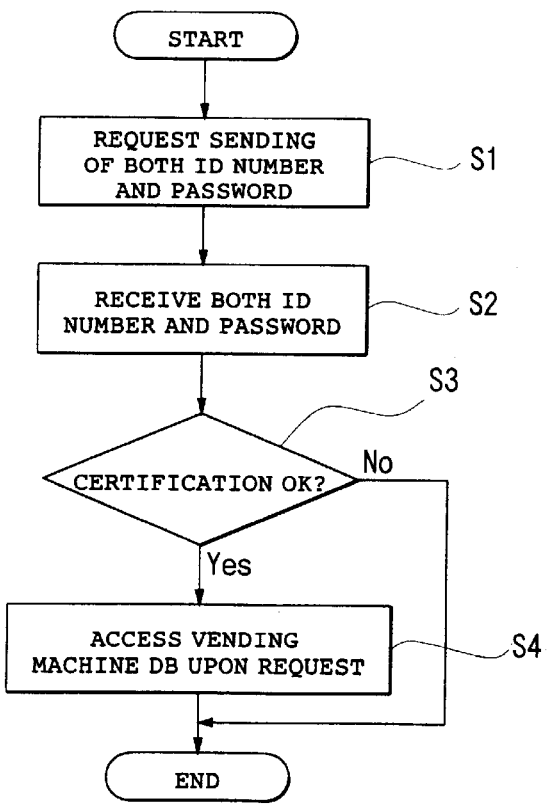
FIG. 2 is a block diagram of a data base of a portable communication terminal in the first embodiment of the present invention.
FIG. 3 is a flowchart of the operation of a remote management controller in the host computer in the first embodiment of the present invention.

A description will be made for a management system for vending machines in the first embodiment of the present invention with reference to FIGS. 1 and 2. FIG. 1 shows a block diagram of the management system for vending machines and FIG. 2 shows a block diagram of a data base of a portable communication terminal.

As shown in FIG. 1, this management system for vending machines comprises a plurality of vending machines 100 installed at various places; a host computer 200 connected to those vending machines 100 via a vending machines network 401 and enabled to manage those vending machines 100 in a concentrated manner; and a portable communication terminal 300 connected to the host computer 200 via the Internet 402/gateway server 403/radio communication network 404.

Each vending machine 100 is provided with an interface used to connect the host computer 200 via a vending machine network 401. Consequently, the vending machine 100 can send such sales information on products as the number of sold products, the number of remaining products, a sales sum, etc., as well as such machine information as operation and trouble states of each vending machine to the host computer 200.

The host computer 200 comprises a communication controller 201, which is a connection interface with the vending machine network 401; a vending machine data base 202 for storing sales information on products and machine information on each vending machine 100; and a concentrated manager 203 for vending machines for storing data received from each vending machine 100 in the vending machine data base 202 and accessing the data base 202 so as to manage/analyze the data stored therein. The manager 203 can be operated from such an input device 204 as a keyboard, etc. and enabled to output managed/analyzed data, etc. to such an output device 205 as a CRT, printer, etc.

The host computer 200 also includes a communication controller 206, which is an interface used to connect the Internet 402; a remote management controller 207 used to control accesses of the portable communication terminal 300 to the information stored in the vending machine data base 202; a portable communication terminal data base 208 for storing various information items of the portable communication terminal 300 enabled to access the remote management controller 207; and an identification information manager 209 for managing identification information on the portable communication terminal 300 among various information items stored in the portable communication terminal data base 208.

The remote management controller 207, when receiving a connection request from a portable communication terminal 300, requests the portable communication terminal 300 to send the identification information, then decides whether to enable the connection requested from the portable communication terminal 300 according to the identification information received therefrom and the identification information stored in the portable communication terminal data base 208. In a special case, the remote management controller 207 may be an apparatus that uses a http server, since it connects the portable communication terminal 300 via the Internet 402. In such a case, the portable communication terminal 300 accesses the vending machine data base 202 and the portable communication terminal data base 208 via a CGI (Common Gateway Interface), etc.

The portable communication terminal data base 208 stores various information items related to each portable communication terminal 300, of which access to the remote management controller 207 is enabled accesses. Concretely, as shown in FIG. 2, the portable communication terminal data base 208 stores the terminal ID 501 and the mail address 502 of each portable communication terminal 300, as well as the identification number 503, the password 504, the temporary password 505, and the validity term 506 related to accesses to the remote management controller 207. The terminal ID 501 is an identification number assigned individually to all the portable communication terminal regardless of its accesses to the remote management controller 207. The mail address 502 is an address that data can be sent from/received by via the Internet 402. The identification number 503 and the password 504 are combined to form identification information for deciding whether to enable an access to the remote management controller 207. The temporary password 505, as to be described later, is generated temporarily so as to update the password 504 periodically in the identification information. The validity term 506 denotes a date on which the password 504 is invalidated.

The portable communication terminal 300 is such a radio communication portable terminal as a PDC terminal, GSM terminal, PHS terminal, etc. enabled for data communication. This portable communication terminal 300 is connected to a radio communication network 404. It can also be connected to the Internet 402 via the gateway server 403 that enables the connection between the radio communication network 404 and the Internet 402. This portable communication terminal 300 is also provided with a Web browser and a mail client software. The portable communication terminal 300 may be such a small computer apparatus as a portable telephone and a PDA (Personal Digital Assistant) terminal.

Figure 4:
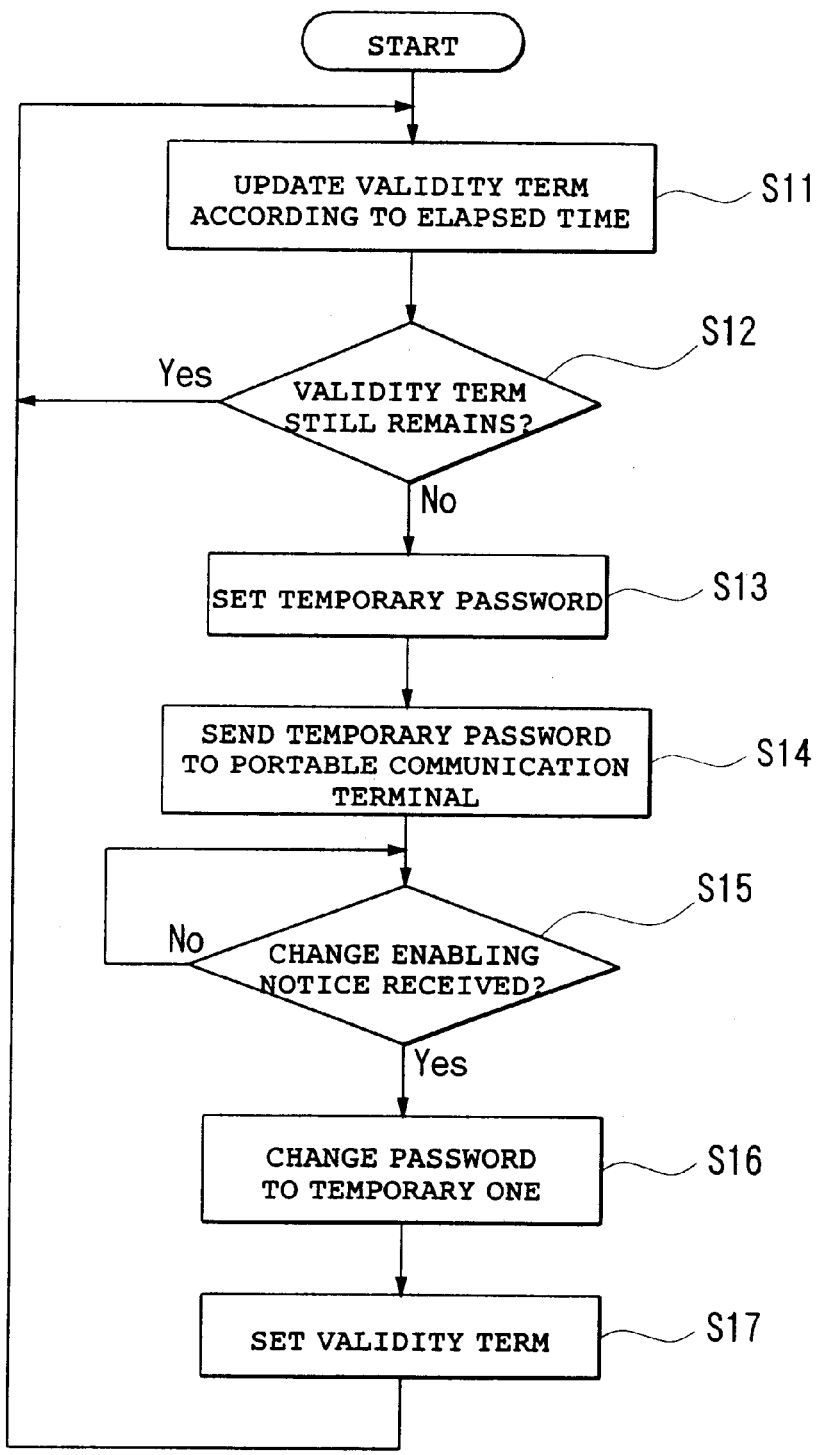
FIG. 4 is a flowchart of the operation of an identification information manager in the host computer in the first embodiment of the present invention.

Next, a description will be made for the operation of the host computer 200 in this management system for vending machines with reference to FIGS. 3 and 4. FIG. 3 shows a flowchart of the operation of a remote management controller 207 and FIG. 4 shows a flowchart of the operation of an identification information manager 209.

Receiving a connection request from the portable communication terminal 300 via the Internet 402, the remote management controller 207 requests the portable communication terminal 300 to send the identification number 503 and the password 504, which are identification information as shown in FIG. 3 (Step S1). When receiving the identification number 503 and the password 504 from the portable communication terminal 300 (Step S2), the remote management controller 207 checks whether or not the portable communication terminal having the identification number 503 is registered in the portable communication terminal data base 208, then certifies the portable communication terminal according to the password 504 (Step S3). When the portable communication terminal 300 is certified, the remote management controller 207 enables the portable communication terminal 300 to access the vending machine data base 202 in response to the request therefrom (Step S4).

Due to the processings in the above steps, the manager who maintains the vending machines and manages supply of products to those vending machines connects the portable communication terminal 300 to the host computer 200 and inputs the identification number 503 and the password 504, thereby enabling the portable communication terminal 300 to access various information items stored in the vending machine data base 202.

In a series of the processings in the above steps, the manager inputs the identification number 503 and the password 504 to the portable communication terminal 300 after connecting the portable communication terminal 300 to the remote management controller 207. In such a case, the manager may also input the URL (Uniform Resource Locator) of the remote management controller 207 used for the Internet 402 to the portable communication terminal 300, so that the portable communication terminal 300 is connected to the remote management controller 207. Concretely, in case where the URL of the remote management controller 207 is http://www.xxxxx.co.jp/i/login.asp, the manager is requested just to input the description of the URL to the browser of the portable communication terminal 300.

There is also a method that any character string included in a URL can be sent to the host computer from a client. When this method is used, the portable communication terminal 300 can send the identification number 503 and the password 504 to the remote management controller 207 at a connection time. For example, when the identification number 503 is "AAAA" and the password 504 is "XXXX" in the above example, the identification number 503 and the password 504 can be output to the remote management controller 207 just by inputting http://www.xxxxx.co.jp/i/login.asp?AAAA+XXXX" to the browser of the portable communication terminal 300. In other words, the steps S1 and S2 described above can be omitted.

Next, the operation of the identification information manager 209 will be described. This identification information manager 209 updates the validity term 506 of the portable communication terminal data base 208 according to the elapsed time (Step S11).

The identification information manager 209 decides whether or not the validity term 506 still remains (Step S12). The validity term 506 is stored in the portable communication terminal data base 208 together with other various information items. When the validity term of the portable communication terminal 300 is expired, the identification information manager 209 generates a temporary password 505 for the portable communication terminal 300 (Step S13) and sends the password 505 to the portable communication terminal 300 (Step S14). The temporary password 505 is sent to the mail address 302 of the portable communication terminal 300 as a mail. Receiving an enabling notice for changing the password from the portable communication terminal 300 that has received the mail, the identification information manager 209 updates the contents of the password 504 of the portable communication terminal 300 to the temporary password 505 in the portable communication terminal data base 208 (Step S15 and S16). Finally, the identification information manager 209 sets a predetermined period (for example 30 days) for the validity term 506 of the portable communication terminal 300 (Step S17).

In a predetermined time after the password in the identification information is updated in the processing in the above step, the identification information manager 209 sends a usable password to the portable communication terminal 300 as a mail after the updating. The user of the portable communication terminal 300 enables the identification information manager 209 to update the password in response to the mail, the password 504 of the portable communication terminal data base 208 is updated to the password received from the identification information manager 209 as a mail. Hereinafter, the portable communication terminal 300 can use the password received as a mail for accessing the remote management controller 207.

As described above, when the identification number 503 and the password 504 are sent so as to connect the portable communication terminal 300 to the remote management controller 207, it would be better to describe an URL that includes the identification number 503 and the temporary password 505 in a mail to be sent from the identification information manager 209 to the portable communication terminal 300. When the URL is described such way, accessing the remote management controller 207 from the portable communication terminal 300 will become more easy and accurate.

As described above in detail, in case of the management system for vending machines in this first embodiment, the manager can use the portable communication terminal 300 to connect the host computer 200 via the Internet 402 and send both identification number 503 and password 504 that are identification information items to the host computer 200, thereby accessing the vending machine data base 202 managed by the host computer 200. In other words, because the portable communication terminal 300 is certified by the host computer 200 when accessing the vending machine data base 202, illegal accesses by third parties to the vending machine data base 202 can be prevented in earlier stages. And, because the certifying means assures the security, the vending machine data base 202 can also be accessed via such a network as the internet 402, which opens to the public. Consequently, the system construction cost can be reduced.

The management system for vending machines in this first embodiment also makes it possible to update the password 504 used for certifying the portable communication terminal 300 periodically. Consequently, even when the password 504 is stolen by a third party, the stolen password 504 is invalidated in a predetermined time. The password 504 is then disabled for accessing the vending machine data base 202. The security of the vending machine data base 202 is such high.

Furthermore, the management system for vending machines in this first embodiment makes it possible to send the temporary password 505, which is usable after the password updating, to the portable communication terminal 300 and update the password 504 to the temporary password 505 after the updating of the password 504 is enabled by the portable communication terminal 300. Consequently, when the portable communication terminal 300 cannot receive the temporary password 505 for any reason, the portable communication terminal 300 can use the original password 504 so as to access the vending machine data base 202.

While the password of each portable communication terminal 300 can be updated periodically in this embodiment, it may be updated depending on necessity rather than being updated periodically. While a mail is used so as to communicate the updated password to the portable communication terminal 300 in the above embodiment, another means may be used, of course.

(Second Embodiment)

Figure 5:
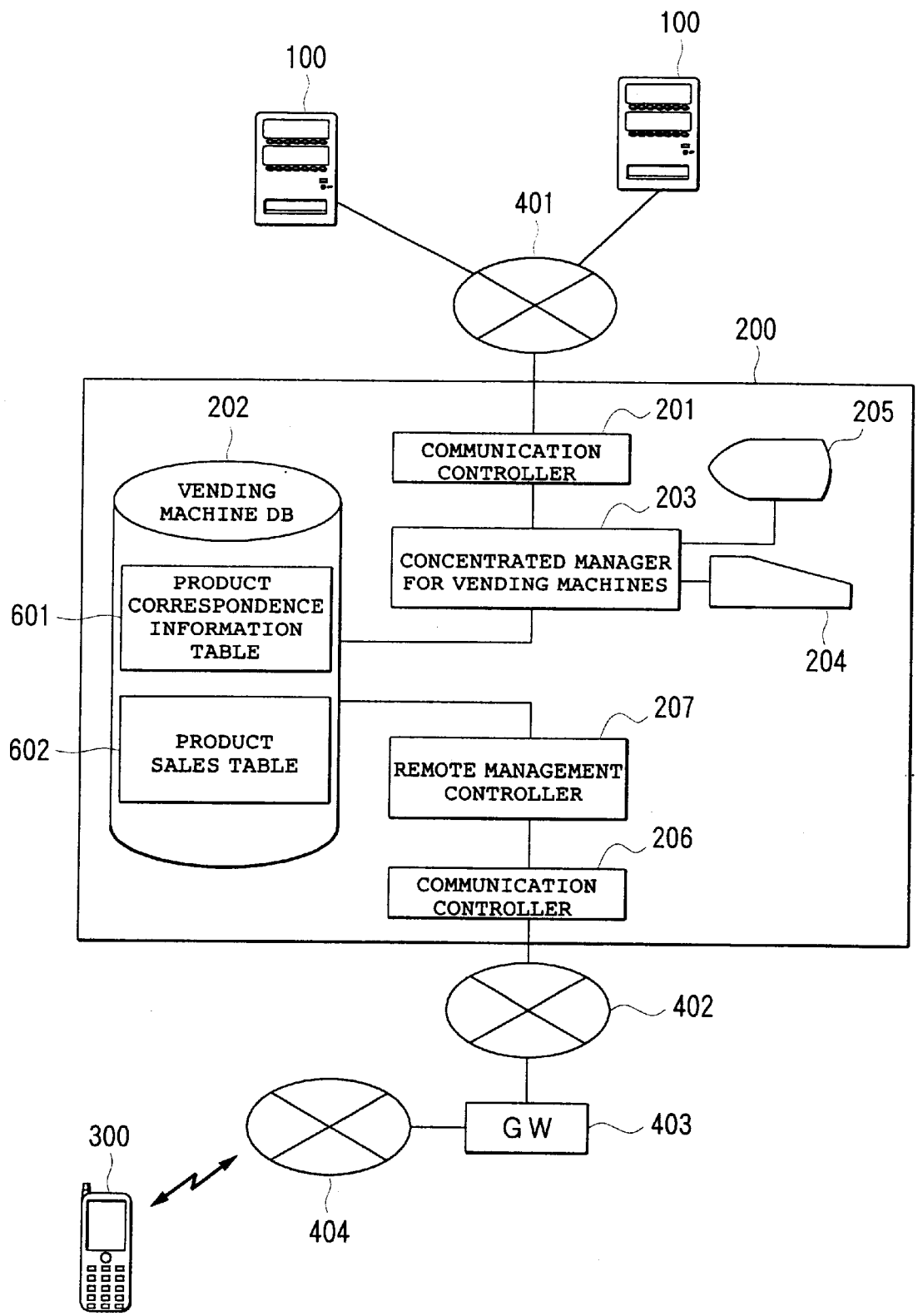
FIG. 5 is a block diagram of the management system for vending machines in the second embodiment of the present invention.

Next, a description will be made for a management system for vending machines in the second embodiment with reference to FIGS. 5 to 7. FIG. 5 shows a block diagram of the management system for vending machines and FIG. 6 shows a data structure of a product correspondence information table. FIG. 7 shows a data structure of a product sales table.

As shown in FIG. 5, the management system for vending machine in this second embodiment comprises a plurality of vending machines 100 installed at various places; a host computer 200 connected to each of those vending machines 100 via a network 401 and enabled to manage those vending machines 100 in a concentrated manner; and a portable communication terminal 300 connected to the host computer 200 via internet 402/gateway server 403 a radio communication network 404.

Each vending machine 100 is provided with an interface used to connect the host computer 200 via a vending machine network 401. Each vending machine 100 is provided with a plurality of product-stacking columns, each of which stacks products therein. Each vending machine 100 counts the number of sold products in each product-stacking column and stores the count and send product sales information to the host computer 200 via the interface. The product sales information includes the number of sold products in each product-stacking column. In addition, each vending machine 100 can send such machine information as its operation/trouble status to the host computer 200. Each vending machine 100 has a vending machine ID preset so as to identify itself. Consequently, each vending machine 100 can be identified by the vending machine ID when in communication with the host computer 200.

The host computer 200 is provided with a communication controller 201 used as an interface with the vending machine network 401, a vending machine data base 202 that stores product sales information and machine information on each vending machine 100, and a concentrated manager 203 for vending machines, which is used to store data received from each vending machine 100 in the vending machine data base 202 and access the vending machine data base 202 so as to manage and analyze the data stored therein. The concentrated manager 203 can be operated from such an input device 204 as a keyboard, etc. and managed/analyzed data can be output onto such an output device 205 as a CRT, printer, etc.

The vending machine data base 202 is provided with a product correspondence information table 601 that stores information on correspondence between products sold by the vending machine 100 and product-stacking column in which the products are stacked for each vending machine 100 and a product sales table 602 that stores sales information on each vending machine 100 and of each product sold therefrom.

Specifically, the product correspondence information table 601 stores the product ID 613 and the product name 614 of products stored in each product-stacking column in each vending machine 100 identified by the vending machine ID 611 and the column number 612 that are key identification information items as shown in FIG. 6. For some vending machines 100, however, the same products may be stacked in a plurality of product-stacking columns as shown in FIG. 6.

The product sales table 602 stores the product name 614 and the sales figure of products 615 identified by the product ID 613 which products have been sold by the vending machine ID 611 as shown in FIG. 7. The vending machine ID 611 and the product key ID 613 are used as key information items for this table. And, as described above, even when the same products are stacked in a plurality of product-stacking columns in a vending machine 100, the number of sold products is counted and stored in the table 602 not for each product-stacking column, but for each product as shown in FIG. 7.

The host computer 200, as shown in FIG. 5, comprises a communication controller 206 used as an interface with the Internet 402, and a remote management controller 207 for controlling accesses of each portable communication terminal 300 to various information items stored in the vending machine data base 202.

The remote management controller 207 certifies the requested connection from a portable communication terminal 300, then controls the access of the portable communication terminal 300 to various information items stored in the vending machine data base 202. The access mentioned here includes not only browsing of and reference to various information items, but also addition and updating of information. Especially, the present invention makes it possible for each portable communication terminal 300 to update the product correspondence information table in the vending machine data base 202. Concretely, such the remote management controller 207 may be an apparatus that uses a http server, since the remote management controller 207 connects each portable communication terminal 300 via the Internet 402. The remote management controller 207, when it is such the apparatus, accesses the vending machine data base 202 via a CGI (Common Gateway Interface).

Each portable communication terminal 300 is such a radio communication portable terminal as a PDC terminal, a GS terminal, a PHS terminal, etc., which are enabled for data communication. This portable communication terminal 300 is connected to a radio communication network 404 and it can connect the Internet 402 via a gateway server 403 that can connect the radio communication network 404 and the Internet 402 to each other. The portable communication terminal 300 is also provided with a Web browser and a mail client. Concretely, such the portable communication terminal 300 may be a small computer apparatus such as a portable telephone, a PDA (Personal Digital Assistant) terminal.

Figure 8:
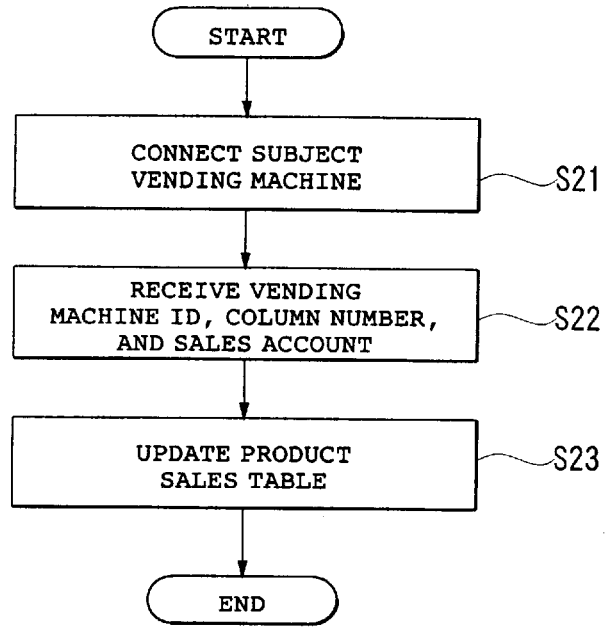
FIG. 8 is a flowchart of the operation of a concentrated manager for vending machines in the host computer in the second embodiment of the present invention.
Figure 9:
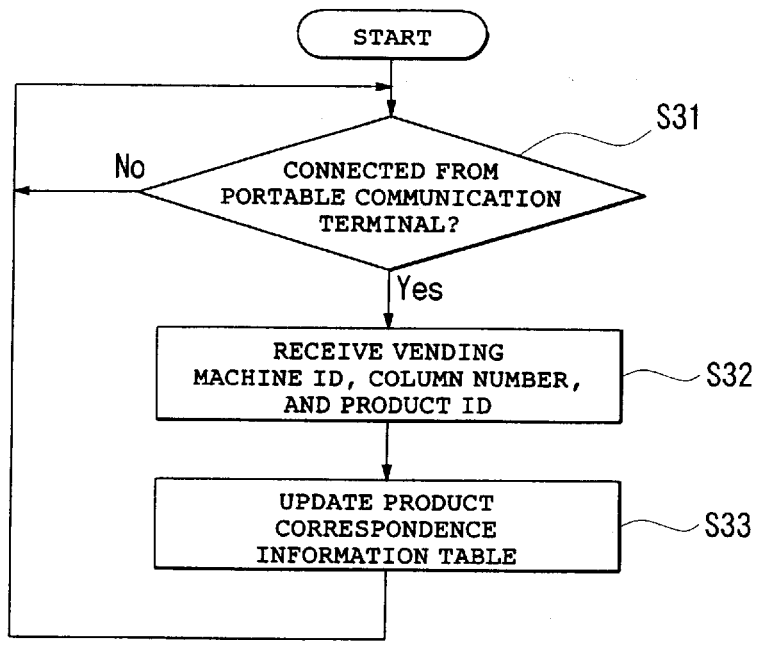
FIG. 9 is a flowchart of the operation of a remote management controller in the host computer in the second embodiment of the present invention.

Next, a description will be made for the operation of the host computer 200 in this management system for vending machines with reference to FIGS. 8 and 9. FIG. 8 shows a flowchart of the operation of the concentrated manager 203 for vending machines. FIG. 9 shows a flowchart of the operation of the remote management controller 207.

The concentrated manager 203 of the host computer 200 connects each of the vending machines 100 sequentially for periodical management and receive sales information, etc. therefrom. Concretely, the concentrated manager 203 connects each vending machine 100 at a fixed time via the network 401 (Step S21 in FIG. 8).

Then, the concentrated manager 203 receives sales information from each vending machine 100 (Step S22). The sales information includes each vending machine ID of the vending machine 100 and each product-stacking column number, and the number of products sold from each product-stacking column. The vending machine 100, after sending the number of product sold, initializes the number of sold products to zero.

The concentrated manager 203 then updates the product sales table 602 in the vending machine data base 202 according to the sales information received from each vending machine 100 (Step S23). Concretely, the concentrated manager 203 refers to the product correspondence information table 601 so as to obtain the product ID of the products stacked in each product-stacking column according to the vending machine ID and the column number received from each vending machine 100. After this, the concentrated manager 203 adds the number of sold products received from the vending machine 100 to the number of sold products identified by the product ID and the vending machine ID.

Due to the processings in the above steps, the product sales information on each vending machine 100 is sent to the host computer 200 periodically, thereby the vending machine data base 202 of the host computer 200 is updated by the product sales information.

On the other hand, the manager who is in charge of supply of products to vending machines, when products in a product-stacking column are replaced with others, connects the host computer 200 via the radio communication network 404/gateway server 403/the Internet 402 so as to send the updated information on products to the host computer 200 via a portable communication terminal 300.

The remote management controller 207 of the host computer 200, when detecting a connection request from a portable communication terminal 300, certifies the terminal 300 as predetermined, then receives the information on correspondence between each product-stacking column and the products stacked therein. Specifically, the remote management controller 207 receives information including the vending machine ID, the product-stacking column number, and the product ID of the products stacked newly in the column of the subject vending machine 100 associated with the product replacement.

The remote management controller 207 then updates the product correspondence information table 601 in the vending machine data base 202 according to the information received from the vending machine 100. Concretely, the remote management controller 207 updates the product ID identified by the vending machine ID and the column number received from a vending machine 100 to the received product ID.

In case where the manager who is in charge of products supply replaces products in a product-stacking column with other products in the processings in the above steps, therefore, the information on correspondence between the product-stacking column and the products stacked in the column can be sent to the host computer 200 via the portable communication terminal 300 immediately so as to update the corresponding information stored in the vending machine data base 202 in the host computer 200.

As described above in detail, the management system for vending machines in this embodiment enables the portable communication terminal 300 to access the vending machine data base 202 in the host computer 200, thereby the manager can keep obtaining the latest information from the host computer 200 even at a place away from the system. When the manager does a maintenance work for a vending machine 100, the manager can send the maintenance result to the host computer 200 via the portable communication terminal 300, thereby the vending machine information in the host computer 200 is updated to the latest information.

Especially, it is possible in this embodiment to update the product correspondence information table 601 that stores information on correspondence between each product-stacking column and the products stacked therein in each vending machine 100 via the portable communication terminal 300. Therefore, no error occurs in updating of the data in the product sales table 602. Conventionally, however, a considerable time such as transfer time for the manager has been required until the manager updates the product correspondence information table 601 in the host computer 200 after actual replacement of products in a column. In addition, the conventional method has also been confronted with a problem that a matching error occurs in the sales information in the product correspondence information table 601 in case where sales information is exchanged between a vending machine 100 and the host computer 200 after a replacement of products in a product-stacking column and before updating of the data. On the other hand, such a matching error never occurs in sales information in this embodiment, since updated product correspondence information is sent to and updated in the product correspondence information table 601 via a portable communication terminal 300 immediately after replacement of products in a product-stacking column.

While the first and second embodiments of the present invention have been described, the embodiments of the present invention are not limited only to them; it is to be understood that changes and modifications may be made without departing from the spirit or scope of the following claims.

For example, while a description is made for a system in which the host computer is provided with a function for certifying each portable communication terminal in the first embodiment and a system in which the host computer is provided with a function for updating management information in the second embodiment, the present invention may also include a system in which both of the functions are combined.

Furthermore, while each portable communication terminal is provided with a Web browser and a mail client software in the above embodiments, the portable communication terminal may also be provided with a dedicated application. In such a case, the host computer must be configured so as to correspond to the application.

Furthermore, while the network for connecting the host computer to each vending machine is separated from the network for connecting the host computer to each portable communication terminal in the above embodiments, one and the same network may be used for both connections. For example, the host computer, each vending machine, and each portable communication terminal may be connected to each another via the Internet.

We claim:

1. A management system for vending machines, comprising a plurality of vending machines and a host computer connected to each of a plurality of said vending machines via a first network so as to manage those vending machines;

wherein said host computer includes:

management information storage for storing management information related to each of a plurality of said vending machines;

remote management controller for accepting a connection from a portable communication terminal via a second network so as to allow accessing management information stored in said management information storage from said portable communication terminal;

identification information storage for storing identification information on the portable communication terminal of which connection is enabled; and certifying means for certifying said portable communication terminal according to both of identification information received from said portable communication terminal when communication with said portable communication terminal is started and identification information stored in said identification information storage, wherein said certifying means updates periodically identification information on said portable communication terminal stored in said identification information storage and communicates said identification information which is usable after updating to said portable communication terminal.

2. The management system according to claim 1;
wherein said certifying means communicates said identification information which is usable after updating and address information on said remote management controller required for the connection to said remote management controller, to said portable communication terminal.

3. The management system according to claim 1;
wherein said certifying means sends said identification information which is usable after updating to said portable communication terminal and updates identification information stored in said identification information storage to said identification information sent to said portable communication terminal after receiving said updating enabling notice from said portable communication terminal.

4. The management system according to claim 1;
wherein said management information storage includes:
  sales information storage for storing sales information on each vending machine and of each product sold in each vending machine; and
  correspondence information storage for storing information on correspondence between each product-stacking part, in which the products are stacked, and products sold by each said vending machine; and
  said remote management controller updates said information on correspondence stored in said correspondence information storage upon a request from said portable communication terminal.

5. The management system according to claim 1;
wherein said second network includes the Internet.

6. A host computer connected to a plurality of vending machines via a first network and enabled to manage a plurality of said vending machines, said host computer comprising:
  management information storage for storing management information on each vending machine;
  remote management controller for accepting a connection from a portable communication terminal via a second network so as to allow accessing management information stored in said management information storage from said portable communication terminal;
  identification information storage for storing identification information on the portable communication terminal of which connection is enabled; and
  certifying means for certifying said portable communication terminal according to both of identification information received from said portable communication terminal when communication with said portable communication terminal is started and identification information stored in said identification information storage, wherein said certifying means updates periodically identification information on said portable communication terminal stored in said identification information storage and communicates said identification information which is usable after updating to said portable communication terminal.

7. The host computer according to claim 6;
wherein said certifying means communicates said identification information which is usable after updating and address information on said remote management controller required for the connection to said remote management controller, to said portable communication terminal.

8. The host computer according to claim 6;
wherein said certifying means sends said identification information which is usable after updating to said portable communication terminal and updates identification information stored in said identification information storage to said identification information sent to said portable communication terminal after receiving said updating enabling notice from said portable communication terminal.

9. The host computer according to claim 6;
wherein said management information storage includes:
  sales information storage for storing sales information on each vending machine and of each product sold by said vending machine; and
  correspondence information storage for storing information on correspondence between each product-stacking part, in which the products are stacked, and products sold by each said vending machine; and
  said remote management controller updates information on correspondence stored in said correspondence information storage upon a request from said portable communication terminal.

10. The host computer according to claim 6;
wherein said second network includes the Internet.

* * * * *